United States Patent [19]

Jung et al.

[11] Patent Number: 4,962,989
[45] Date of Patent: Oct. 16, 1990

[54] CLAMPING APPARATUS FOR AN ARRAY OF OPTICAL FIBER FILAMENTS

[75] Inventors: Roger E. Jung, Chingford; Brian P. Mills, Hornchurch, both of Great Britain

[73] Assignee: Telephone Cables Limited, England

[21] Appl. No.: 401,754

[22] Filed: Aug. 31, 1989

[30] Foreign Application Priority Data

Nov. 9, 1988 [GB] United Kingdom ................ 8826202

[51] Int. Cl.⁵ .......................... G02B 6/26; G02B 6/40; B65D 85/38; B65D 1/34
[52] U.S. Cl. ............................. 350/96.20; 350/96.10; 350/96.22; 206/316.1; 206/484; 206/485; 206/565; 248/68.1
[58] Field of Search ............... 350/96.10, 96.20, 96.21, 350/96.22; 206/316.1, 329, 332, 485, 484, 562, 564, 565; 248/68.1

[56] References Cited

U.S. PATENT DOCUMENTS

| | | | |
|---|---|---|---|
| 4,046,454 | 9/1977 | Pugh, III | 350/96.21 |
| 4,077,702 | 3/1978 | Kunze et al. | 350/96.21 |
| 4,123,138 | 10/1978 | Morrison | 350/96.21 |
| 4,254,865 | 3/1981 | Pacey et al. | 206/316 |
| 4,319,951 | 3/1982 | Korbelak et al. | 156/502 |
| 4,489,830 | 12/1984 | Charlebois et al. | 206/316 |
| 4,627,686 | 12/1986 | Szentesi | 350/96.20 |
| 4,645,292 | 2/1987 | Sammueller | 350/96.20 |
| 4,685,764 | 8/1987 | Hoffer et al. | 350/96.20 |
| 4,818,054 | 4/1989 | George et al. | 350/96.20 |
| 4,818,055 | 4/1989 | Patterson | 350/96.21 |
| 4,824,197 | 4/1989 | Patterson | 350/96.21 |
| 4,865,412 | 9/1989 | Patterson | 350/96.21 |

FOREIGN PATENT DOCUMENTS

| | | | |
|---|---|---|---|
| 0061367 | 9/1982 | European Pat. Off. | 350/96.20 X |
| 53-26142 | 3/1978 | Japan | 350/96.21 |
| 2122378 | 1/1984 | United Kingdom | 350/96.20 X |
| 2199420 | 7/1988 | United Kingdom | 350/96.20 X |

Primary Examiner—Brian Healy
Attorney, Agent, or Firm—Kirschstein, Ottinger, Israel & Schiffmiller

[57] ABSTRACT

A comb-like support structure for optical cords has slots of uniform width having resiliently-compressible walls which grip frictionally the cords. Intermediate portions of the cords are simply pushed into corresponding slots from one end. The cord support is conveniently mounted in one wall of a distribution frame for optical fibre transmission systems.

8 Claims, 3 Drawing Sheets

CLAMPING APPARATUS FOR AN ARRAY OF OPTICAL FIBER FILAMENTS

BACKGROUND OF THE INVENTION

1. Field of the Invention

This invention relates to apparatus for clamping an array of generally parallel adjacent filaments, and is particularly useful for clamping releasably a group of optical cords near the external wall of an optical distribution frame for the connection of an optical fibre cable to individual optical cords.

2. Description of Related Art

U.K. patent application No. 2199419A discloses a distribution frame for an optical fibre transmission system. Such a distribution frame provides connections between a plurality of optical cables and a respective multiplicity of connection fibres which may be in the form of single or multi-fibre elements or cords, having the fibre or fibres protected by an outer coating or cover. In the example described, the optical cords enter the distribution frame through openings in an upper panel. As disclosed in U.K. patent application No. 2199420A, this panel may support pairs of resilient separating straps which bear against the sides of the optical cords and hold them apart, thus clamping the cords tidily and in a manner which does not damage them.

SUMMARY OF THE INVENTION

The purpose of the invention is to simplify the clamping arrangement and to make the clamping apparatus cheaper to manufacture. Accordingly, the invention provides apparatus for clamping an array of generally parallel adjacent filaments, comprising at least three coplanar fingers whose adjacent side faces, normal to the plane of the fingers, define between them slots whose major portions at least are of uniform width for receiving intermediate portions of the respective filaments extending normal to the plane of the fingers, the side faces being resiliently compressible by an inserted filament whereby to grip frictionally that filament with a force which does not vary with the position of the filament along the major portion of the slot.

Thus several optical cords may be clamped frictionally within the same slot, each with the same clamping force. Further, the resilient compressibility of the side faces means that the slot can accommodate filaments, such as optical cords, with a range of different diameters, if necessary at the same time in the same slot.

In the assembly of a distribution frame using the apparatus of GB-A-2199419 as described above, it is necessary to thread the optical cords through respective pairs of the resilient separating straps, and correspondingly during disassembly for service purposes it is necessary to draw the entire length of each optical cord back through the corresponding pair of straps.

In a preferred form of the invention, the slots are open at one end only for receiving the intermediate portions of the respective filaments. This clamping apparatus facilitates the assembly and disassembly of filaments such as optical cords especially ones which are terminated with connectors wider than the cords.

Because the slot is open-ended, assembly and disassembly is especially simple, since it involves simply pushing an intermediate portion of the filament into the slot in a direction generally in the plane of the slots and fingers. It is therefore not necessary for the end of the filament to be free, nor for the filament to be looped within the space to one side of that plane, as might for example be necessary in the threading of the end of an optical cord through the pair of separating straps in the system disclosed in U.K. patent application No. 2199420 described above. The fingers are preferably formed of a single piece of the resiliently compressible material, conveniently foam, and they are preferably straight and parallel to each other forming a comb-like structure. The fingers are preferably held in a rigid cage with bars each supporting a different finger between adjacent slots.

BRIEF DESCRIPTION OF THE DRAWINGS

In order that the invention may be better understood, a distribution frame embodying the invention will now be described, by way of example only, with reference to the accommpanying schematic drawings, in which.

DETAILED DESCRIPTION OF THE PREFERRED EMBODIMENT

Figure 1:
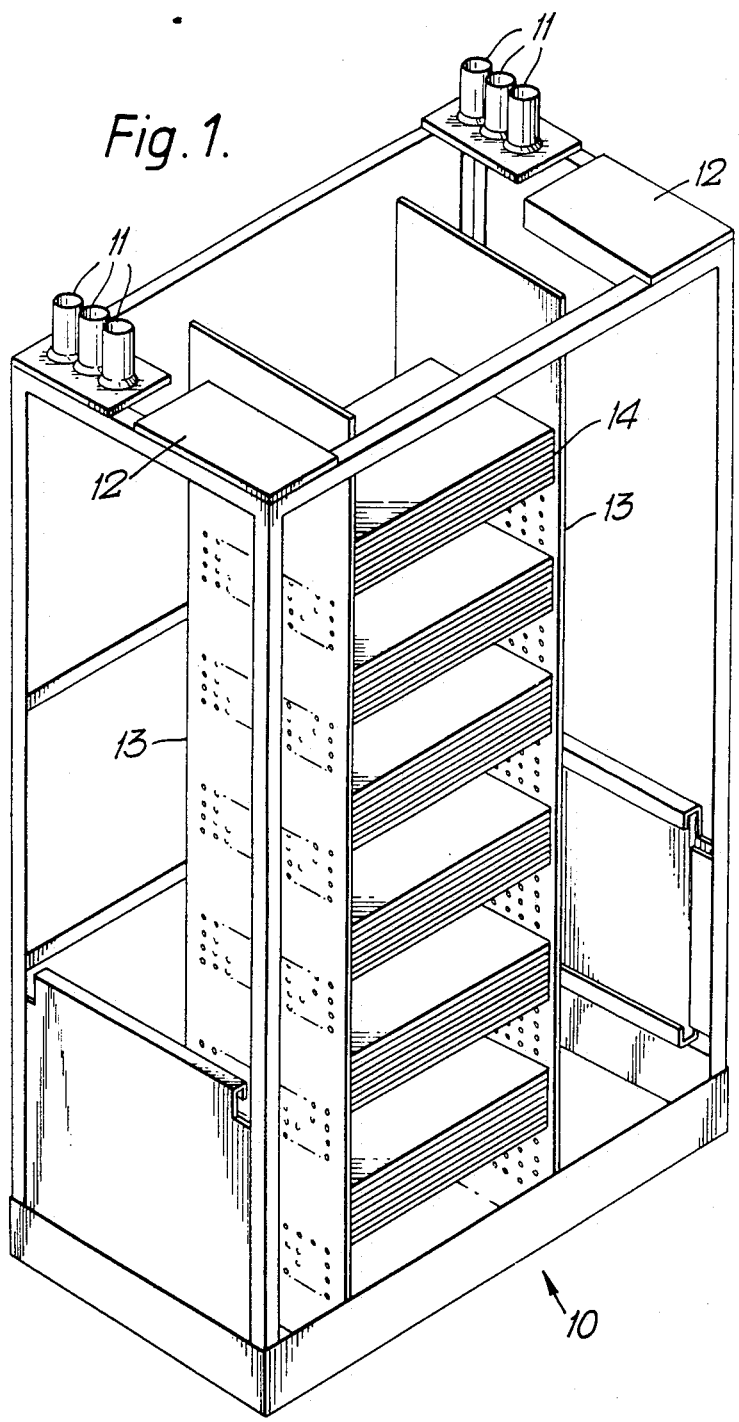
FIG. 1 is a perspective view of the distribution frame partly assembled.
Figure 2:
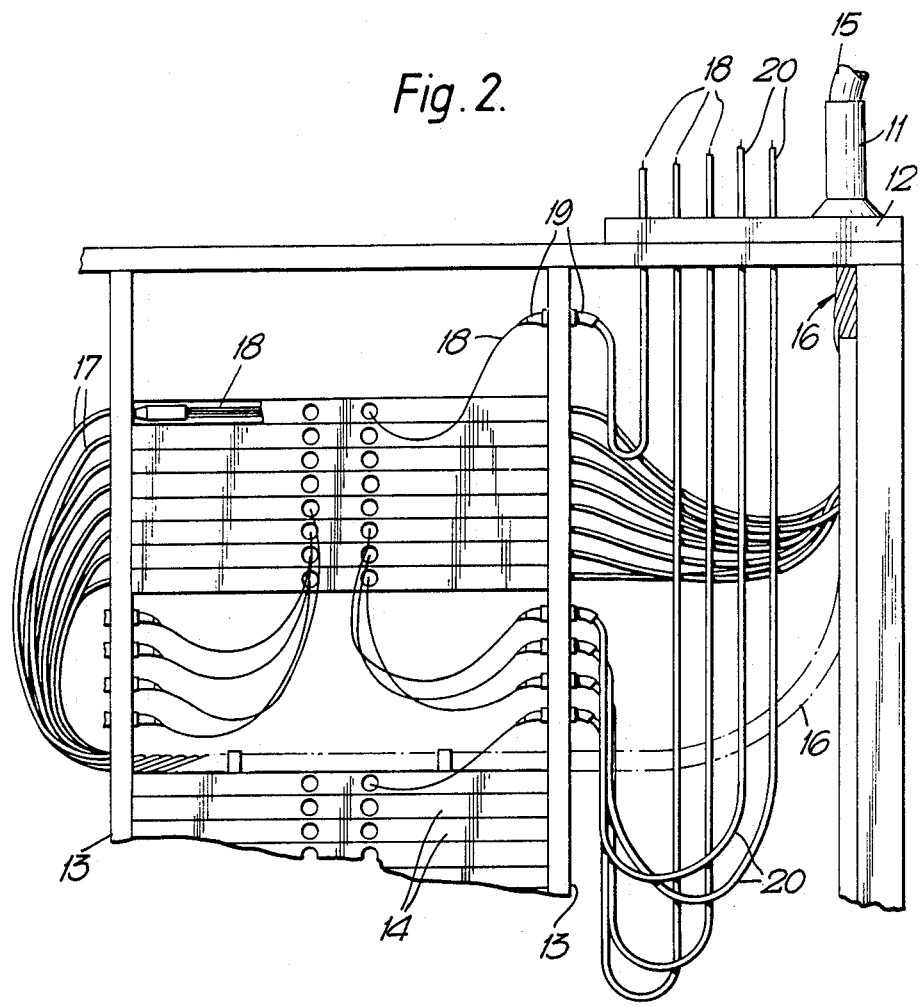
FIG. 2 is a partial front elevation, to an enlarged scale, of the distribution frame of FIG. 1 when assembled with optical cable and connection fibres.

The distribution frame is illustrated in FIGS. 1 and 2, and described in detail in U.K. patent application No. 2199419A to which reference has already been made. The distribution frame 10 comprises a closed parallelepiped box with removable panels forming its walls. The box houses two parallel, spaced, inner panels 13 which support between them several arrays 14 of organiser trays in which may be coiled several loops of excess optical fibre. The function of the distribution frame 10 is to provide readily servicable connections between the individual optical fibres of an optical cable 15 and corresponding connection fibres 20 which lead to external apparatus not shown. The optical cable consists of several tubes 17 each containing several optical fibres 18, the tubes 17 being stranded, as at 16, and sheathed, as at 15. The sheath 15 is terminated at a cable entry sleeve 11. Individual fibres 18 from the tubes 17 are looped within respective organiser trays 14 and are then connected, by way of couplers 19 on each side of corresponding apertures in the inner panels 13, to corresponding connection fibres in the form of optical cords 20. Each optical cord 20 consists of an individual optical fibre 18 and a protective sheath.

The optical cords 20 exit the top panel of the distribution frame 10 parallel to each other and in parallel rows. A cord support 12, shown more clearly in FIG. 3, is provided in the plane of the upper panel of the distribution frame 10, at each of two corners, the other two corners being occupied by sets of cable entry sleeves 11.

Figure 3:
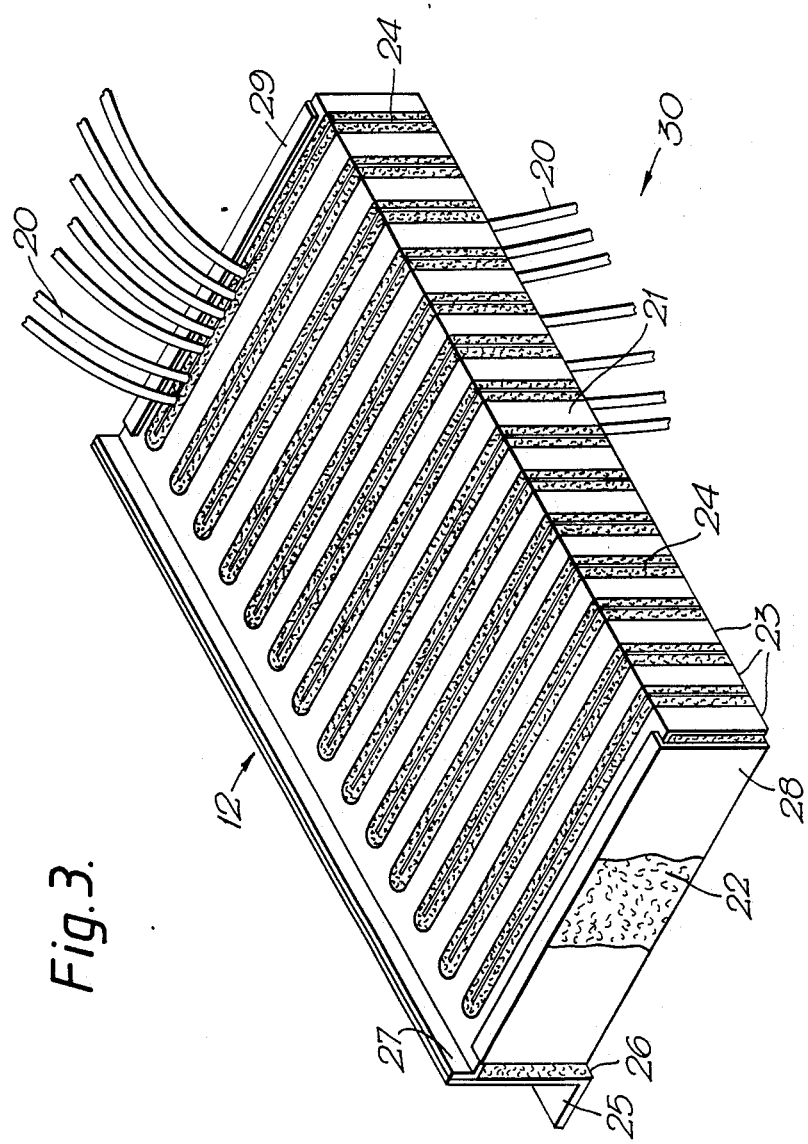
FIG. 3 is a perspective view, to a greatly enlarged scale, of the cord support for clamping an array of the connection fibres in the region at which they exit the distribution frame of FIGS. 1 and 2.

The cord support 12 is a comb-like structure having several, in this case fourteen, straight, parallel slots 24 each for receiving several cords 20, of which some are shown in FIG. 3. The cord support 12 comprises a single piece of thermoplastics foam 22 of rectangular section and thin in relation to its width and length in top plan view. Narrow slots 24 are cut into the foam 22, the walls of each slot being flat and parallel and parallel to the end faces of the cord support 12, so that each slot has a uniform width. Nevertheless, the edges of the slots may be radiused where the cords are to enter and exit from the cord support. Each slot is open-ended at the same end, which in this example is the vertical face of the cord support which faces inwardly of the distribution frame 10.

Thus the foam 22 consists of several, in this case fifteen, straight, parallel fingers which are resiliently deformable. The foam 22 is supported by a rigid metal cage 21 comprising, for each finger, a bar 23 for supporting the finger. The cage also comprises a pair of channel-shaped end plates 28, and a rear bracket 25 of L-shaped section. The main portion of the cage 21 consisting of the loops 23 is formed from a single metal sheet from which are cut fourteen parallel slots; the sheet is then folded twice through a right-angle to the configuration shown in FIG. 3, and is further folded at its ends to form two right-angle flanges 26, 27 for connection to the rear bracket 25. Upon insertion of the slotted foam 22, the end plates 28 are secured.

In use of the distribution frame 10, intermediate portions of the optical cords 20 may be simply be pushed into any of the slots 24 in the direction of the arrow 30. The slots are of such a width that each of the cords 20 causes resilient deformation of both walls of the slot so that the reaction from the foam is sufficient to grip frictionally the cord 20 without exerting undue pressure. Several optical cords may thus be clamped in the same slot 24, and, providing their mutual spacing is sufficient, as shown in FIG. 3, it is even possible for the cords 20 to have different diameters. The slots between the rigid metal bars 23, however, must of course be wide enough to accommodate the cords 20 without contact.

In this example, the slots are open-ended. However, in an alternative form, the slots are closed at their ends, and the slots are widened, at one or two locations, just sufficiently to allow a connector or coupler 19 to be passed through the slot, in a direction normal to the major faces of the support structure. The or each widened portion could be in the form of an arcuate cut made in each of the opposed edges of the metal bars 23, and a corresponding cylindrical bore through the foam 22, to form a keyhole-shaped region. This would enable a cord and its coupler 19 to be threaded through the widened region of the slot, and then slid sideways to be gripped in the slot. Typically, the "keyhole" widened diameter is 12 mm, the slot width between bars being 10 mm and the cord diameter being 3 mm.

Although the support 12 in this example is designed for clamping optical cords 20, the invention could equally well be applied to other filaments such as electric wires or optical or electric cables. Further, although the slots are shown as being straight and parallel, this is not essential, provided only that each slot has a uniform width along its length. The structure illustrated in FIG. 3 is especially simple and cheap to manufacture, but other structures would of course be feasible, including structures without a rigid cage, and structures using resiliently deformable materials other than the foam described.

The structure could also be used in apparatus other than optical distribution frames, such as low optical fibre count terminations and even optical cord storage racks.

We claim:

1. Apparatus for clamping an array of generally parallel adjacent filaments, comprising: at least three coplanar resiliently compressible foam fingers whose adjacent side faces, normal to the plane of the fingers, define between them slots whose major portions at least are of uniform width, for receiving intermediate portions of the respective filaments extending normal to the plane of the fingers, the side faces being resiliently compressible by an inserted filament whereby to grip frictionally that filament with a force which does not vary with the position of the filament along the major portion of the slot.

2. Apparatus according to claim 1, in which the slots are open at one end only for receiving the intermediate portions of the respective filaments.

3. Apparatus according to claim 1, in which the fingers are formed of a single piece of resiliently compressible material.

4. Apparatus according to any claim 1, in which the fingers are straight and parallel to each other forming a comb-like structure.

5. A distribution frame for an optical fibre transmission system, comprising a cabinet to which is attached clamping apparatus according to claim 1.

6. A distribution frame according to claim 5, in which several optical filaments having one end within the cabinet and the other end outside the cabinet have intermediate portions clamped in corresponding ones of the said slots.

7. Apparatus for clamping an array of generally parallel adjacent filaments, comprising: at least three coplanar fingers whose adjacent side faces, normal to the plane of the fingers, define between them slots whose major portions at least are of uniform width, for receiving intermediate portions of the respective filaments extending normal to the plane of the fingers, the side faces being resiliently compressible by an inserted filament whereby to grip frictionally that filament with a force which does not vary with the position of the filament along the major portion of the slot; and a rigid cage with bars, each supporting a different finger between adjacent ones of the slots.

8. Apparatus for clamping an array of generally parallel adjacent filaments, comprising: at least three coplanar fingers whose adjacent side faces, normal to the plane of the fingers, define between them slots whose major portions at least are of uniform width, for receiving intermediate portions of the respective filaments extending normal to the plane of the fingers, the side faces being resiliently compressible by an inserted filament whereby to grip frictionally that filament with a force which does not vary with the position of the filament along the major portion of the slot; and a rigid cage with bars, each supporting a different finger between adjacent ones of the slots, said cage having a unitary structure with slots in register with corresponding ones of the said slots.

* * * * *